US008769313B2

United States Patent
Bi et al.

(10) Patent No.: US 8,769,313 B2
(45) Date of Patent: Jul. 1, 2014

(54) SERVER WITH AN EMBEDDED MANAGEMENT BOARD HAVING A POWER CONTROLLING UNIT FOR CONTROLLING A PLURALITY OF POWER SUPPLIES AND MOTHERBOARDS INDEPENDENTLY

(75) Inventors: Wunan Bi, Shanghai (CN); Xiao-Ru Wu, Shanghai (CN); Tsu-Cheng Lin, Taipei (TW)

(73) Assignee: Inventec Corporation, Taipei (TW)

( * ) Notice: Subject to any disclaimer, the term of this patent is extended or adjusted under 35 U.S.C. 154(b) by 1045 days.

(21) Appl. No.: 12/635,029

(22) Filed: Dec. 10, 2009

(65) Prior Publication Data

US 2011/0113263 A1 May 12, 2011

(30) Foreign Application Priority Data

Nov. 9, 2009 (CN) .......................... 2009 1 0211876

(51) Int. Cl.
  *G06F 1/00* (2006.01)
  *G06F 1/32* (2006.01)
(52) U.S. Cl.
  CPC .................................. *G06F 1/3203* (2013.01)
  USPC ....................................................... 713/300
(58) Field of Classification Search
  CPC ..................................................... G06F 1/3203
  USPC ....................................................... 713/300
  See application file for complete search history.

(56) References Cited

U.S. PATENT DOCUMENTS

| 6,014,322 | A * | 1/2000 | Higashi et al. .................. 363/65 |
| 6,967,487 | B2 * | 11/2005 | Garnett .......................... 324/537 |
| 2004/0181730 | A1 * | 9/2004 | Monfared et al. ............ 714/745 |
| 2006/0082222 | A1 * | 4/2006 | Pincu et al. ...................... 307/29 |
| 2006/0265608 | A1 * | 11/2006 | Fung ............................. 713/300 |
| 2007/0260896 | A1 * | 11/2007 | Brundridge et al. .......... 713/300 |

FOREIGN PATENT DOCUMENTS

| CN | 101464717 | 6/2009 |
| CN | 101572437 | 11/2009 |

OTHER PUBLICATIONS

"First Office Action of China Counterpart Application", issued on Nov. 24, 2011, p. 1-p. 5.

* cited by examiner

*Primary Examiner* — Thomas Lee
*Assistant Examiner* — Gayathri Sampath
(74) *Attorney, Agent, or Firm* — CKC & Partners Co., Ltd.

(57) ABSTRACT

The present invention provides a server including a plurality of power supplies independent from each other, a management backplane, a first embedded management board (first EMB) and a plurality of motherboards independent from each other. The power supplies are turned on or off according to a first control signal. The management backplane is coupled to the power supplies, the first EMB and the motherboards. The first EMB has a power-controlling unit and produces the first control signal and an acknowledgement signal according to the load status, the quantity of a plurality of turned on power supplies and a power-on demand command. The motherboards respectively send out the power-on demand command and decide whether or not to power on according to the acknowledgement signal, wherein when the first EMB works, a polling mode is used to sequentially switch the connections between the first EMB and the motherboards through the management backplane.

11 Claims, 1 Drawing Sheet

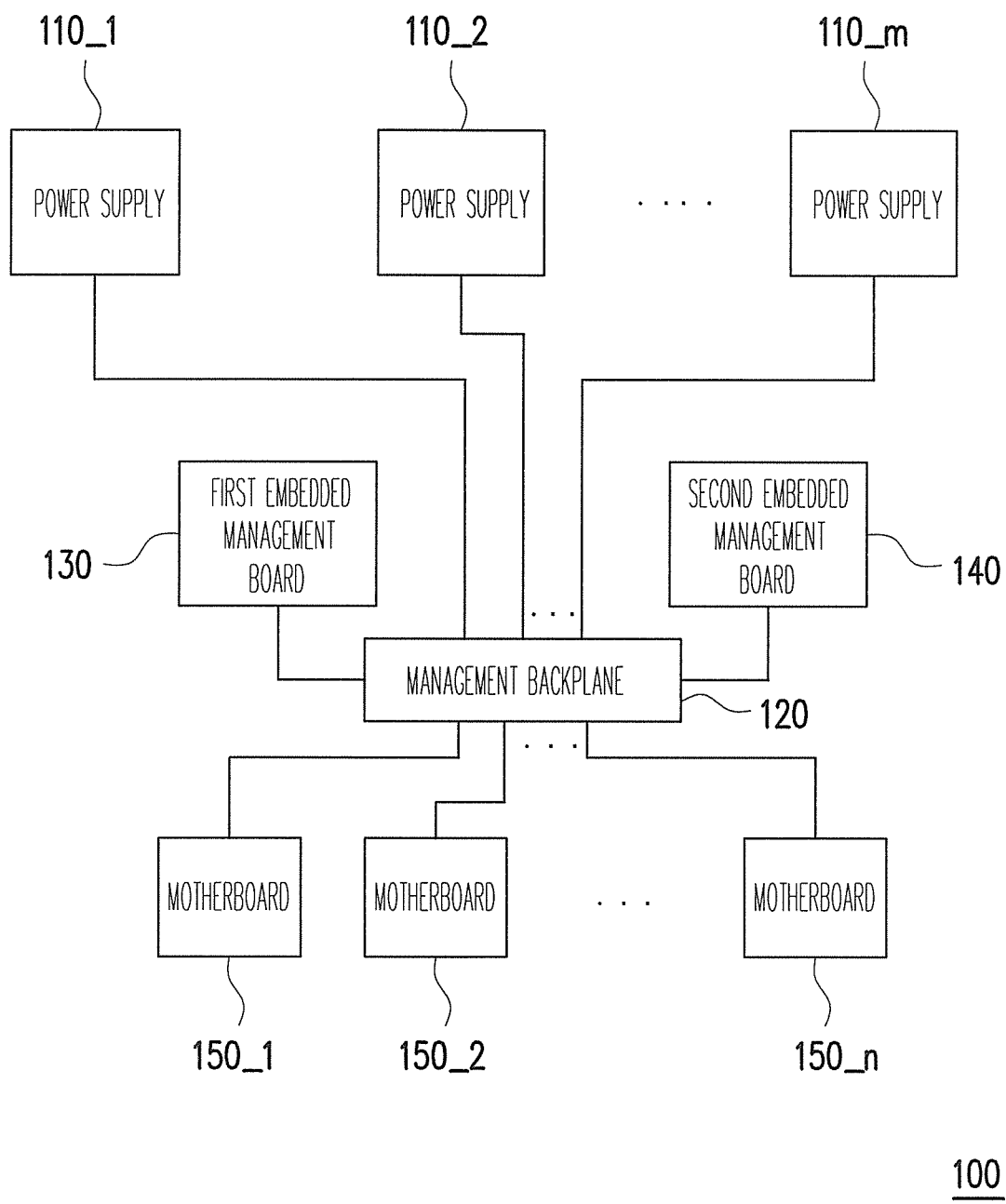

US 8,769,313 B2

SERVER WITH AN EMBEDDED MANAGEMENT BOARD HAVING A POWER CONTROLLING UNIT FOR CONTROLLING A PLURALITY OF POWER SUPPLIES AND MOTHERBOARDS INDEPENDENTLY

CROSS-REFERENCE TO RELATED APPLICATION

This application claims the priority benefit of China application serial no. 200910211876.X, filed Nov. 9, 2009. The entirety of the above-mentioned patent application is hereby incorporated by reference herein and made a part of specification.

BACKGROUND OF THE INVENTION

1. Field of the Invention

The present invention generally relates to a server, and more particularly, to a server with power management function.

2. Description of Related Art

Generally, the power-on control of power supply for the motherboards in a server is realized by adopting a power-on circuit to directly control the powers of the power supplies in the server, so that when the motherboards are required to work, a control signal is sent to notify the power supplies of providing the powers, followed by monitoring the working status of the powers for normal operation through a "power good" signal of the powers. However, the above-mentioned scheme is suitable for a server with fewer power supplies and fewer motherboards only where the powers are directly controlled and the statuses can be simpler monitored.

Along with increasing quantity of motherboards employed by a server, the quantity of the employed power supplies is increased as well so as to supply the powers for all the motherboards. Therefore, the above-mentioned static control scheme that counts as simpler and statistical one is not suitable to the server with more motherboards any more. The above-mentioned server employs a plurality of motherboards and a plurality of power supplies, thus, the match between the quantity of the motherboards and the quantity of the power supplies is critical issue to be solved, while the un-match between the quantity of the motherboards and the quantity of the power supplies may lead to power overload and even make the server fail to normally work. On the other hand, the power consumption of the motherboards has great flexibility, wherein if the server is designed to be able providing such power level to meet the requirement of the maximum load and the all-and-fulltime operation (i.e., tuning on all the power supplies) of the powers, an operation with a lower load would be accompanied with lower efficiency and wasting the power.

SUMMARY OF THE INVENTION

Accordingly, the present invention is directed to a server able to effectively manage the powers thereof and dynamically control the power-providing situation of the power supplies thereof.

The present invention provides a server, which includes a plurality of power supplies independent from each other, a management backplane, a first embedded management board (first EMB) and a plurality of motherboards independent from each other. The power supplies independent from each other are turned on or off according to a first control signal. The management backplane is coupled to the above-mentioned first EMB. The first EMB has a power-controlling unit and is coupled to the above-mentioned management backplane. The first EMB produces the above-mentioned first control signal and an acknowledgement signal according to the load status, the quantity of a plurality of turned on power supplies independent from each other and a power-on demand command. The motherboards independent from each other are respectively coupled to the above-mentioned management backplane, send out the above-mentioned power-on demand command and decide whether or not to power on according to the above-mentioned acknowledgement signal, wherein when the above-mentioned first EMB works, a polling mode is used to sequentially switch the connections between the first EMB and the motherboards independent from each other through the management backplane.

In an embodiment of the present invention, when the power supplies independent from each other work, the power supplies respectively send an analog signal to the first EMB via the management backplane so that the first EMB obtains the said load status.

In an embodiment of the present invention, the above-mentioned first EMB persistently switches the communications between the first EMB and the motherboards independent from each other through the said management backplane to perform the polling switching operations.

In an embodiment of the present invention, when the load status exceeds a first limit load, the first EMB produces and sends the first control signal to one of the power supplies independent from each other via the said management backplane so as to turn on a new power supply, wherein the first limit load varies according to the quantity of the turned-on power supplies independent from each other.

In an embodiment of the present invention, when the load status is lower than a second limit load, the first EMB produces and sends the first control signal to one of the power supplies independent from each other via the said management backplane so as to turn off the power supply, wherein the second limit load varies according to the quantity of the turned-on power supplies independent from each other.

In an embodiment of the present invention, the above-mentioned first EMB tests a present signal corresponding to each of the power supplies independent from each other to know the quantity of the power supplies and thereby determine the quantity of the power-on ones among the motherboards independent from each other and determine whether or not producing the said acknowledgement signal.

In an embodiment of the present invention, when the first EMB receives the power-on demand command sent by the said motherboard, the first EMB ceases the polling and the said motherboard waits for receiving the acknowledgement signal and then is turned on or not according to the received acknowledgement signal.

In an embodiment of the present invention, the connections between the management backplane and the power supplies independent from each other are implemented by an inter-integrated circuit (I2C) bus and the connections between the management backplane and the motherboards independent from each other are implemented by an intelligent platform management bus (IPMB).

In an embodiment of the present invention, the above-mentioned server further includes a second embedded management board (EMB) having a power-controlling unit and coupled to the said management backplane, wherein the second EMB produces a second control signal and the acknowledgement signal according to the load status, the quantity of the turned-on power supplies independent from each other and the power-on demand command, and the power supplies independent from each other are further turned on or off according to the second control signal and the motherboards independent from each other whether or not power-on according to the acknowledgement signal, wherein the first EMB and the second EMB persistently test the statuses of the counterpart EMB through the said management backplane so as to decide which one of the two EMBs is in working status and the rest one is in standby status; when the second EMB works, a polling mode is used to sequentially switch the connections between the second EMB and the motherboards independent from each other through the management backplane.

In an embodiment of the present invention, when the first EMB is in the working status and the second EMB is in the standby status, the first EMB controls the power supplies independent from each other for being turned on or off and controls the motherboards independent from each other for being power-on or not through the management backplane; when the first EMB is in the standby status or in fault, the second EMB enters the working status, the second EMB controls the power supplies independent from each other for being turned on or off and controls the motherboards independent from each other for being power-on or not through the management backplane.

The present invention uses the motherboards to send out the power-on demand command, and the first EMB produces the control signal to control the power supplies for working or not and produces the acknowledgement signal for notifying the motherboards to be power-on or not according to the load status, the quantity of the turned-on power supplies and the power-on demand command. In this way, the present invention is able to effectively manage the powers and dynamically control the power supplies for supplying situation. In addition, when the first EMB is in fault, the second EMB takes over the operation of the first EMB so as to continue the power management task.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a structure block diagram of a server according to an embodiment of the present invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a structure block diagram of a server according to an embodiment of the present invention. Referring to FIG. 1, a server 100 includes a plurality of power supplies independent from each other 110_1-110_m, a management backplane 120, a first EMB 130 and a plurality of motherboards 150_1-150_n, wherein m and n are respectively a positive integer greater than zero.

The power supplies 110_1-110_m are turned on or off according to a first control signal. The management backplane 120 is coupled to the first EMB 130. The first EMB 130 has a power-controlling unit and is coupled to the management backplane 120. The first EMB 130 would produce a first control signal and an acknowledgement signal according to the loading status, the quantity of the turned-on ones among the power supplies 110_1-110_m and a power-on demand command. The motherboards 150_1-150_n are coupled to the management backplane 120, sends out the power-on demand command and decides whether or not to power on according to the acknowledgement signal.

In the embodiment, when the power supplies 110_1-110_m work, the power supplies would respectively send an analog signal to the first EMB 130 so that the first EMB 130 obtains the above-mentioned loading status, wherein when the first EMB 130 work, a polling mode is used to sequentially switch the connections between the first EMB 130 and the motherboards 150_1-150_n through the management backplane 120. In addition, the first EMB 130 persistently switches the communications between the first EMB 130 and the motherboards 150_1-150_n independent from each other through the said management backplane 120 and conducts the polling switching operation. It should be noted that in the embodiment, the connections between the management backplane 120 and the power supplies 110_1-110_m are implemented by an inter-integrated circuit (I2C) bus, so that the first EMB 130 can conduct polling on the power supplies 110_1-110_m. On the other hand, the connections between the management backplane 120 and the motherboards 150_1-150_n are implemented by an intelligent platform management bus (IPMB) so that the first EMB 130 can conduct polling on the motherboards 150_1-150_n through the IPMB.

The first EMB 130 can test out a present signal corresponding to each of the power supplies 110_1-110_m so as to know the quantity of the power supplies and further determine the quantity of the power-on ones among the motherboards and determine whether or not producing the said acknowledgement signal. The power supply sent out the present signal only if exist. For example, assuming one power supply can provide two motherboards with power-on, when the server 100 has two power supplies 110_1 and 110_2, the first EMB 130 tests out the present signals respectively corresponding to the power supplies 110_1 and 110_2 so as to conclude there is two power supplies. As a result, it is determined that the available quantity of the motherboards with power-on is four and it is also determined whether or not to produce the acknowledgement signal. When the quantity of the power-on motherboards in the server is less than four and at the time there is a motherboard without power-on sends out a power-on demand command, the first EMB 130 would produce a acknowledgement signal to the above-mentioned motherboard so as to the above-mentioned motherboard power on. Moreover, when the quantity of the power-on motherboards in the server reaches four already, and at the time there is a motherboard without power-on sends out a power-on demand command, the first EMB 130 would not produce and send the acknowledgement signal to the above-mentioned motherboard. As a result, the above-mentioned motherboard is not power-on. The above-mentioned explanation is an example of the present invention only, which the present invention is not limited to.

In addition to the above-mentioned depiction about the relations between the components in the server 100 and the functions of the components, the following depiction is further about the operation of the server 100. First, when the first EMB 130 is connected to the motherboard 150_1 by switching and the motherboard 150_1 sends out a power-on demand command, the first EMB 130 would ceases polling and produce a first control signal (for example, high level) according to the loading status (assuming the load at the time does not exceed the maximum load, i.e., does not exceed the first limit load), so that an acknowledgement signal (for example, high level) is produced and sent to the motherboard 150_1. As a result, the motherboard 150_1 is power-on and enters the working status. At least two power supplies are turned on if exist to offer the power and back up for system stability.

Next, the first EMB 130 is switched to connect the next motherboard, i.e., the motherboard 150_2 to keep the successive operation. After that, when the motherboard 150_2 does not send out the power-on demand command, the first EMB 130 would move on to be switched to the next motherboard, i.e., the motherboard 150_3. When the first EMB 130 is switched to connect the motherboard 150_3 and the motherboard 150_3 sends out the power-on demand command, the first EMB 130 would cease the polling and produce the first control signal and the acknowledgement signal according to the loading status as well.

At the time, if the loading status does not exceed the first limit load (i.e., the maximum power one power supply is able to provide), the first EMB 130 still keeps controlling the power supply 110_1 for providing power and produces the acknowledgement signal sent to the motherboard 150_3 so as to the motherboard 150_3 is power-on and works. The above-mentioned operation means the server 100 only uses the power supply 110_1 to provide power, the power supply 110_2 for back up.

On the other hand, if the loading status exceeds the first limit load (i.e., the maximum power the power supply 110_1 is able to provide), the first EMB 130 would produce the first control signal (for example, high level). The first control signal is sent to the management backplane 120 and then the power supply 110_3 so as to turn on the power supply 110_3 for providing power and to produce the acknowledgement signal sent to the motherboard 150_3. At the time, the motherboard 150_3 is power-on and works. Meanwhile, the server 100 uses both the power supply 110_1, 110_2 and the power supply 110_3 to provide power, and the first limit load at the time is just the maximum power two power supplies together are able to provide, which means the first limit load in the embodiment varies with the quantity of the turned on power supplies. For example, when the server 100 uses one power supply to provide power, the first limit load is the maximum power one power supply is able to supply; when the server 100 uses two power supplies to provide power, the first limit load at the time is just the maximum power two power supplies together are able to provide, and analogically for the rest, which is omitted to describe.

During the server 100 is working, the loading status detected by the first EMB 130 is not always increased. In fact, the loading status sometime may be decreased; i.e., a motherboard may power off or the power consumption of a motherboard is decreased. Therefore, when the first EMB 130 has detected that the loading status is lower than a second limit load, the first control signal is sent to the said management backplane 120 to turn off one of the power supply (110_1 or 110_2). It should be noted that the second limit load in the embodiment varies with the quantity of the turned on power supplies. For example, when the server 100 uses three power supplies to provide power, the second limit load is the maximum power three power supplies are able to supply; when the server 100 uses two power supplies to provide power, the second limit load at the time is just the maximum power two power supplies together are able to provide, and analogically for the rest. Commonly a rest power supply is just for back up, do not vary the limit load.

In order to prevent instantaneous over-current, in the embodiment, during increasing load, the first limit load of a new power supply turned on by the first limit load first EMB 130 is set to be lower than the rated power of the above-mentioned new power supply. For example, assuming the rated power of the above-mentioned new power supply is 1100 W, the first limit load is set as 900 W but no power range thereof is limited. When the first EMB 130 detects the loading status exceeds 900 W (the first limit load), a new power supply is turned on and the server 100 at the time uses two power supplies to provide power.

In addition, in order to prevent an electrical oscillating phenomena caused by the same values of the first limit load and the second limit load, the second limit load usually is set to be lower than the first limit load. For example, assuming the first limit load is 900 W but the second limit load is set as 700 W but no power range thereof is limited, and when the server 100 uses two power supplies for providing power, once the first EMB 130 has detected the loading status of 700 W, one of the two power supplies is turned off so that the server 100 uses a single power supply for providing power.

In this way, the server 100 of the embodiment can effectively manage the powers and dynamically control the powers for turning on/off according to the loading status. Besides, when all the power supplies 110_1-110_m are turned on but all the powers together still fail to meet the power consumption requirement of the motherboards 150_1-150_n−1 and the motherboard 150_n sends out the power-on demand command, since the loading status at the time has reached saturation, the first EMB 130 would send the acknowledgement signal (for example, low level) to the 150_n so that the 150_n is not power on.

At the time, the server 100 has possibility to be overloaded, for example, if the server 100 in running is forced to disconnect the power or a power supply in running is in fault, the first EMB 130 would make all efforts to maintain the statuses of all the motherboards within the maximum supportable power. On the other hand, if the loading status exceeds the maximum supportable power of the present on-duty power, the first EMB 130 would send out the acknowledgement signal (for example, low level) so as to forcedly turn off a motherboard until no overload any more.

The power-controlling unit of the first EMB 130 has high response speed, which means assuming a power supply in running is suddenly disconnected or in fault, the first EMB 130 is able to immediately produce the first control signal so as to turn on a power supply in standby status.

The server 100 of the embodiment further includes a second EMB 140, and the second EMB 140 plays a same role as the first EMB 130. The second EMB 140 has a power-controlling unit and is coupled to the management backplane 120. The second EMB 140 produces a second control signal according to the loading status, the quantity of the turned-on ones among the power supplies 110_1-110_m and the acknowledgement signal, wherein the power supplies 110_1-110_m can be turned on/off according to the second control signal. When the second EMB 140 is in working status, a polling mode is used to make the management backplane 120 switch the connections between the second EMB 140 and the motherboards 150_1-150_n. Moreover when the power supplies 110_1-110_m are in working status, each of the power supplies 110_1-110_m sends an analog signal to the said second EMB 140 so as to make the second EMB 140 obtain the loading status. The second EMB 140 can detect the present signal of each of the power supplies 110_1-110_m to know the exist quantity of the power supplies and further determine how many motherboards can be power-on by the available power supplies and whether or not to produce the acknowledgement signal.

In the embodiment, the first EMB 130 and the second EMB 140 persistently test the statuses of the counterpart EMB through the said management backplane 120 so as to decide which one of the two EMBs is in working status and the rest one is in standby status. For example, when the first EMB 130 works normally, an activating message is produced and at the time, the second EMB 140 is in standby status (i.e., the second EMB 140 is out of duty). When the first EMB 130 is in abnormal status (for example, in fault during the update process), no activating message is produced, then the second EMB 140 starts working and takes over the job of the first EMB 130 (the job of controlling the powers). On the other hand, when the second EMB 140 works normally, and an activating message is produced and at the time, the first EMB 130 is in standby status (i.e., the first EMB 130 is out of duty). When the second EMB 140 is in abnormal status, no activating message is produced, then the first EMB 130 starts working and takes over the job of the second EMB 140. In addition, during the inter-testing of the first EMB 130 and the second EMB 140, it is not the EMB in working status sends out the activating message only; instead, the EMBs respectively in working status and in standby status send a detecting message and an answer message to the counterpart, and when no response from the counterpart is received within a certain time, it is concluded that the counterpart is in fault.

In the embodiment, during the first EMB 130 and the second EMB 140 are testing the statuses of the counterpart EMB, when the first EMB 130 is in working status and the second EMB 140 is in standby status, the operation can be understood referring to the above-mentioned embodiment of the first EMB 130, which is omitted to describe.

The first EMB 130 may be in fault. At the situation, since the first EMB 130 and second EMB 140 persistently test the statuses of the counterpart EMB, the second EMB 140 can not receive the activating message produced by the first EMB 130 or does not receive the response from the first EMB 130 after a certain time, which indicates the first EMB 130 is in fault. After that, the second EMB 140 would start working and take over the job of the first EMB 130. At the time, the second EMB 140 uses polling mode to sequentially connect the motherboards 150_1-150_n through the management backplane 120. Since the second EMB 140 has taken over the job of the first EMB 130 already, the second EMB 140 would adjust the power-providing statuses of the power supplies according to the first limit load and the second limit load. The operation of the second EMB 140 is explained as follows.

When the second EMB 140 is in working status, if the second EMB 140 is connected to the motherboard 150_1 by switching, and the motherboard 150_1 sends out the power-on demand command, the second EMB 140 would ceases polling and produce a second control signal (for example, high level) according to the loading status (assuming the load at the time does not exceed the maximum load, i.e., does not exceed the first limit load), so that the power supply 110_1 is turned on and an acknowledgement signal (for example, high level) is produced and sent to the motherboard 150_1. As a result, the motherboard 150_1 is power-on and enters the working status.

Next, the second EMB 140 is switched to connect the next motherboard, i.e., the motherboard 150_2 to keep the successive operation. After that, when the motherboard 150_2 does not send out the power-on demand command, the second EMB 140 would move on to be switched to the next motherboard, i.e., the motherboard 150_3. When the second EMB 140 is switched to connect the motherboard 150_3 and the motherboard 150_3 sends out the power-on demand command, the second EMB 140 would cease the polling and produce the second control signal and the acknowledgement signal according to the loading status as well.

At the time, if the loading status does not exceed the first limit load (i.e., the maximum power the power supply 110_1 is able to provide), the second EMB 140 still keeps controlling the power supply 110_1 for providing power and produces the acknowledgement signal sent to the motherboard 150_3 so as to the motherboard 150_3 power on and works. The above-mentioned operation means the server 100 only uses the power supply 110_1 to provide power.

On the other hand, if the loading status exceeds the first limit load (i.e., the maximum power one power supply is able to provide), the second EMB 140 would produce the second control signal (for example, high level). The second control signal is sent to the management backplane 120 and then the power supply 110_2 so as to turn on the power supply 110_2 for providing power and to produce the acknowledgement signal sent to the motherboard 150_3. At the time, the motherboard 150_3 is power-on and works. Meanwhile, the server 100 uses two power supplies to provide power, and the first limit load at the time is just the maximum power two power supplies together are able to provide.

During the server 100 is working, the loading status is not always increased. In fact, the loading status sometime may be decreased. Therefore, when the second EMB 140 has detected that the loading status is lower than the second limit load, the second control signal is sent to the said management backplane 120 to turn off the power supply (110_1 or 110_2).

In summary, the present invention uses the motherboards to send out the power-on demand command, and the EMB produces the control signal to control the power supplies for working or not and produces the acknowledgement signal for notifying the motherboards to be power-on or not according to the load status, the quantity of the turned-on power supplies and the power-on demand command. In this way, the present invention is able to effectively manage the powers and dynamically control the power supplies for supplying situation. In addition, when the first EMB is in fault, the second EMB takes over the operation of the first EMB so as to continue the power management task.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A server, comprising:
 a plurality of power supplies independent from each other, wherein the power supplies are respectively turned on or off according to a first control signal;
 a management backplane, coupled to the power supplies independent from each other;
 a first embedded management board, having a power-controlling unit, coupled to the management backplane and producing the first control signal and an acknowledgement signal according to a load status, the quantity of the power supplies being turned on and a power-on demand command; and
 a plurality of motherboards independent from each other, respectively coupled to the management backplane, the plurality of motherboards sending out the power-on demand command and respectively being powered on according to the acknowledgement signal, wherein when the first embedded management board works, a polling mode is used to sequentially switch the connec- tions between the first embedded management board and the motherboards through the management backplane.

2. The server as claimed in claim 1, wherein when the power supplies work, the power supplies respectively send an analog signal to the first embedded management board via the management backplane so that the first embedded management board obtains the load status.

3. The server as claimed in claim 1, wherein the first embedded management board persistently switches the communications between the first embedded management board and the motherboards through the management backplane to perform the polling switching operations.

4. The server as claimed in claim 1, wherein when the load status exceeds a first limit load, the first embedded management board produces and sends the first control signal to one of the power supplies via the management backplane so as to turn on the one of the power supplies, wherein the first limit load varies according to the quantity of the power supplies being turned on.

5. The server as claimed in claim 1, wherein when the load status is lower than a second limit load, the first embedded management board produces and sends the first control signal to one of the power supplies via the management backplane so as to turn off the one of the power supplies, wherein the second limit load varies according to the quantity of the power supplies being turned on.

6. The server as claimed in claim 1, wherein the first embedded management board tests a present signal corresponding to each of the power supplies to know the quantity of the power supplies and thereby determine the quantity of the motherboards being powered on and determine whether or not producing the acknowledgement signal.

7. The server as claimed in claim 6, wherein when the first embedded management board receives the power-on demand command sent by the motherboard, the first embedded management board ceases the polling, and the motherboard waits for receiving the acknowledgement signal and then is turned on or not according to the received acknowledgement signal.

8. The server as claimed in claim 1, wherein the connections between the management backplane and the power supplies are implemented by an inter-integrated circuit bus.

9. The server as claimed in claim 1, wherein the connections between the management backplane and the motherboards are implemented by an intelligent platform management bus.

10. The server as claimed in claim 1, further comprising:

a second embedded management board, having a power-controlling unit and being coupled to the management backplane, wherein the second embedded management board produces a second control signal and the acknowledgement signal according to the load status, the quantity of the power supplies being turned on and the power-on demand command, and the power supplies are further respectively turned on or off according to the second control signal and the motherboards respectively being powered on according to the acknowledgement signal;

wherein the first embedded management board and the second embedded management board persistently test the statuses of the counterpart embedded management board through the management backplane so as to decide which one of the two embedded management boards is in working status and the rest one is in standby status; when the second embedded management board works, the polling mode is used to sequentially switch the connections between the second embedded management board and the motherboards through the management backplane.

11. The server as claimed in claim 10, wherein when the first embedded management board is in the working status and the second embedded management board is in the standby status, the first embedded management board controls the power supplies for being turned on or off and controls the motherboards for being powered on or not through the management backplane; when the first embedded management board is in the standby status or in fault, the second embedded management board enters the working status, the second embedded management board controls the power supplies for being turned on or off and controls the motherboards independent from each other for being powered on or not.

* * * * *